United States Patent

Poggi, Jr. et al.

[11] Patent Number: 5,458,667
[45] Date of Patent: Oct. 17, 1995

[54] LEAK-FREE FURNACE AIR FILTER MOUNTING ASSEMBLY

[76] Inventors: Robert E. Poggi, Jr., 5 Lincoln Rd.; Robert E. Poggi, Sr., 2451 Circle Dr., both of Ottawa, Ill. 61350

[21] Appl. No.: 346,416

[22] Filed: Nov. 29, 1994

Related U.S. Application Data

[63] Continuation-in-part of Ser. No. 183,053, Jan. 18, 1994, abandoned.

[51] Int. Cl.⁶ .................................................. B01D 46/00
[52] U.S. Cl. .................... 55/480; 55/441; 55/502
[58] Field of Search ............................ 55/467, 478, 480, 55/481, 502

[56] References Cited

U.S. PATENT DOCUMENTS

| | | | |
|---|---|---|---|
| 2,473,006 | 6/1949 | Campbell et al. | 55/481 |
| 3,247,652 | 4/1966 | Annas et al. | 55/481 |
| 3,494,113 | 2/1970 | Kinney | 55/481 |
| 3,626,668 | 12/1971 | Cardiff | 55/481 |
| 3,630,008 | 12/1971 | Revell et al. | 55/481 |
| 3,789,589 | 2/1974 | Delany et al. | 55/481 |
| 3,993,464 | 11/1976 | Pelabon | 55/481 |
| 4,290,788 | 9/1981 | Pittman et al. | 55/481 |
| 4,365,541 | 12/1982 | Marques et al. | 55/481 |
| 5,030,264 | 7/1991 | Klotz et al. | 55/481 |
| 5,125,941 | 6/1992 | Ernst et al. | 55/481 |

*Primary Examiner*—C. Scott Bushey
*Attorney, Agent, or Firm*—Leydig, Voit & Mayer, Ltd.

[57] ABSTRACT

A mounting assembly for a replaceable air filter panel in a forced air heating, air conditioning, or air purifying unit includes a filter housing with an access opening to slidably receive a flat rectangular air filter panel and a pair of spring-loaded guide deflectors in the air flow passage of the housing positioned substantially inwardly of the access opening to urge the leading edge portion of the panel into sealing engagement with a sealing strip disposed in the housing opposite from the access opening. A hingeless, removable, and selectively invertible door closure member is used to sealingly close the access opening of the mounting assembly, and a filter deflector, installed on the inner face of the door closure member and projecting inwardly therefrom, urges the trailing edge portion and the balance of the peripheral edge of the filter panel into substantial leak-free sealing engagement with the rest of the internal sealing strip disposed about the inner periphery of the air flow passage when the closure member is assembled to the access opening, The filter deflector and the spring-loaded guide deflectors are disposed and arranged such that the filter mounting assembly can accommodate and effectively seal filter panels of different thicknesses.

12 Claims, 2 Drawing Sheets

LEAK-FREE FURNACE AIR FILTER MOUNTING ASSEMBLY

This is a continuation-in-part application of U.S. application Ser. No. 08/183,053, filed on Jan. 18, 1994, now abandoned.

FIELD OF THE INVENTION

The present invention relates generally to air filter mounting assemblies for use in furnace and air conditioning systems, and, more particularly, concerns a substantially leak free air filter mounting assembly which can accommodate and effectively seal filter panels of different thicknesses.

BACKGROUND OF THE INVENTION

In forced air heating and air conditioning systems it is desirable to employ an air filter to cleanse the air of dust, dirt, pollutants, and other airborne particles. Typically, this is done by installing an air filter in the intake duct so that the intake air must flow through the air filter. The air filter may be formed of screening, a fiberglass batt, an electrostatic panel or the like, depending upon environmental conditions and the degree to which it is desired to clean the air. To facilitate ease of service and replacement, the air filter is usually housed in a mounting assembly interposed between the air return duct and the air intake of the furnace or air conditioning unit. The housing generally has an opening on one side to permit inserting the filter and sliding it through the housing across the air flow path. The installation opening is often merely a slot in the housing of the filter mounting assembly and frequently is not even closed by a door.

Generally speaking, the cleaner it is desired for the air to be, the more efficient the air filter unit must be. Thus, panels made up of a batt of fiberglass fibers typically remove more dirt and dust than simple screen filters, which are only effective to trap larger size particles. Properly installed electrostatically charged panels or electronic panels are even more efficient and may remove more than 90% of the airborne pollutants from the air, including mold, spores, smoke, and bacteria. Filter efficiency, however, is often adversely affected by the mounting arrangement and the need to provide for easy and inexpensive access for filter installation and replacement. Accordingly, conventional filter housings with simple side or top openings tend to admit unfiltered air downstream of the filter panel. Moreover, in order to slide the filter panel through the housing, the mounting must provide for a relatively loose fit to prevent binding. This, in turn, allows for a substantial amount of air leakage around the edges of the filter panel rather than causing all of the air to flow through the filter medium.

Conventional filter mounting assemblies are also constructed such that the installation opening and housing can only accommodate filter panels of a standard, predetermined thickness. As a result, if a different thickness filter panel is desired, a refurbishment of the existing filter mounting assembly is usually required. For instance, if a thicker-than-standard filter panel is used, the width of the existing housing and installation opening must be enlarged so that the thicker panel may be received. On the other hand, if a thinner-than-standard filter panel is used, the existing housing does not necessarily have to be modified. Nevertheless, an adjustment is generally advisable—otherwise the fit between the filter panel and the housing will be extremely loose, a substantial amount of air will bypass the filter, and there will be a significant drop in filter efficiency.

OBJECTS AND SUMMARY OF THE INVENTION

It is the primary aim of the present invention to provide a substantially leak free air filter mounting assembly for use in forced air furnaces, air conditioning systems, and/or air purifying systems.

A more detailed object is to provide such a filter mounting assembly which holds the peripheral edges of the filter panel in substantially air tight relation against the interior walls of the mounting assembly. It is a more specific object to provide a filter mounting assembly which automatically guides and urges the filter panel into sealing engagement with the filter cabinet housing as the filter panel is slid into and through the mounting assembly.

A further object is to provide a filter mounting assembly which can readily accommodate and effectively seal filter panels of different thicknesses.

A related object is to furnish a filter mounting assembly which can accommodate and effectively seal custom-built filter panels of different lengths.

Still another object is to furnish a filter mounting assembly which can easily, readily, and inexpensively be converted from a conventional, non-electronic system to an electronic system without modifying the existing filter cabinet.

A further object is to provide a filter cabinet with two-way mounting capability such that the access opening can be installed on either side of the intake duct to facilitate filter accessibility and replacement.

A related object is to provide a hingeless, removable door closure member which is selectively invertibly mountable to the access opening such that it can be installed either top side up or top side down.

Yet another object is to provide a filter mounting assembly which is simple and inexpensive to make and install and which is reliable and convenient to use.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
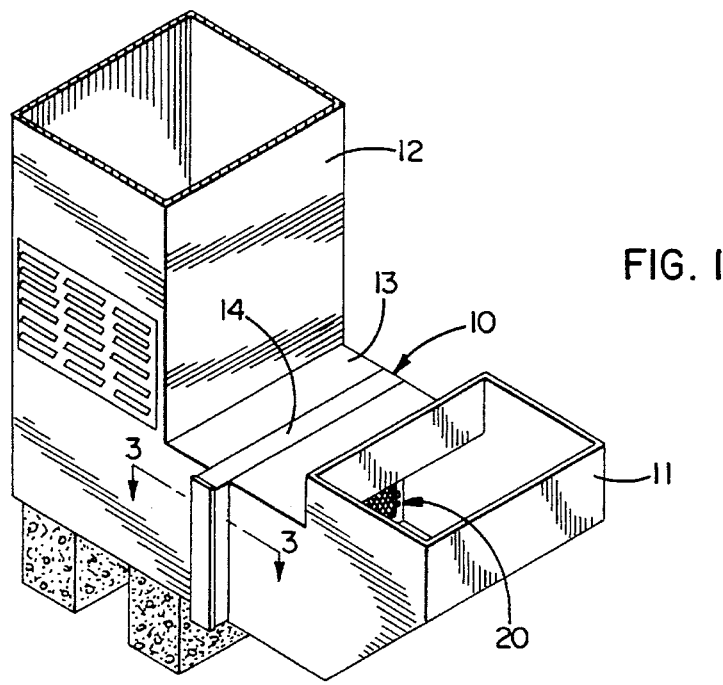
FIG. 1 is a partial perspective view of an air intake coupled to a furnace or air conditioning unit with a filter mounting assembly according to the present invention interposed therebetween.

Turning now to the drawings, FIG. 1 shows in somewhat diagrammatic form an air filter mounting assembly 10, constructed in accordance with the present invention, installed between an air intake or return air duct 11 and a blower unit 12, which may be part of a conventional forced air heating system, air conditioning system, and/or air purifying system. It will be understood that a blower or fan (not shown) in the unit 12 draws air from the air intake or return duct 11 through the air filter mounting assembly 10 and into an entry portion 13 which defines an air intake opening of the unit 12.

Figure 2:
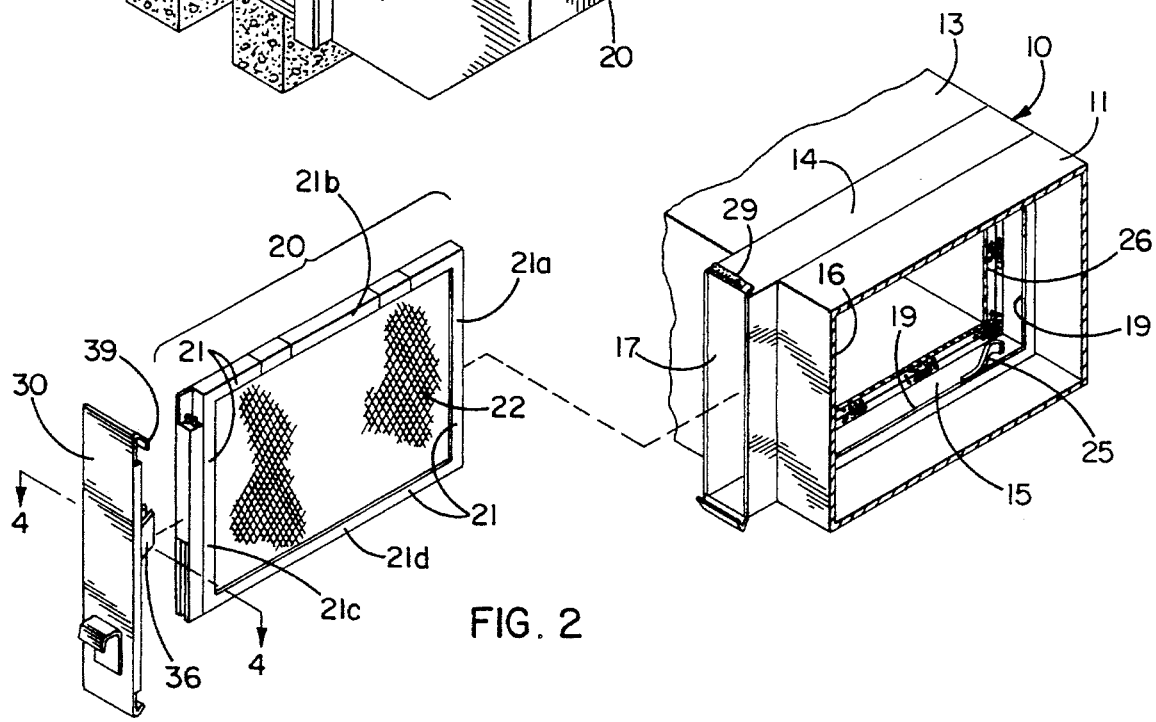
FIG. 2 is an exploded, somewhat enlarged, perspective view of the air filter mounting assembly of FIG. 1 with the air filter and the removable door closure member detached therefrom.

In FIG. 2, the air filter mounting assembly 10 of the present invention is shown in an exploded perspective view. The mounting assembly 10 includes a housing or filter cabinet 14 having an entrance end connected to the intake duct 11 (only a portion of which is shown) and a discharge end sealingly connected to the entry portion 13 of the blower unit 12 (only a portion of which is shown). The housing 14 has a perimeter wall 15 defining a substantially rectangular internal cross section and an air flow passage 16 therethrough between the respective entrance and discharge ends of the housing 14. In the preferred embodiment, the housing or filter cabinet 14 is formed of 26-gauge galvanized steel sheet metal.

Pursuant to the invention, one side of the perimeter wall 15 is formed with an access opening 17 dimensioned for slidable insertion and retraction of a replaceable air filter panel 20. As shown in FIG. 2, the air filter panel 20 is substantially rectangular in shape, and has an interior filter medium 22 as well as a marginal or peripheral edge 21. More particularly, the peripheral edge 21 comprises a leading edge portion 21a, a trailing edge portion 21c, and a pair of spaced-apart upper and lower guide edge portions 21b and 21d which interconnect the aforementioned leading and trailing edge portions 21a and 21c. The air filter panel 20 may employ any type of filter medium 22, but preferably includes a high efficiency air filter, such as an electrostatic discharge filter which electrostatically attracts dust, dirt and other particulate matter when air flows through the screening elements 22 of the filter panel 20 or a more traditional electronic filter which purifies the air when charged electronically. In order for such air filter panels to operate at their peak efficiencies it is, of course, necessary to mount them in a substantially leak-free manner within the filter housing 14.

In accordance with the present invention, the air filter mounting assembly 10 includes sealing means 24 disposed in the discharge end of the air flow passage 16 with a strip of sealing material, such as plastic foam, dimensioned for sealing engagement with the peripheral edge 21 of the air filter panel 20 when the panel 20 is slid through the access opening 17 and substantially completely across the air flow passage 16. In addition, the air filter mounting assembly 10 includes a guide means 25 mounted in the air flow passage 16 of the housing 14 and disposed substantially inwardly from the access opening 17. The guide means 25 urges the leading edge portion 21a of the air filter panel 20 into sealing engagement with the most inward portion of the internal sealing means 24 when the panel 20 is slid substantially completely across the air flow passage 16. Preferably, the sealing means 24 also includes a sealing strip 26 disposed to abut the leading edge portion 21a of the filter panel 20.

Figure 3:
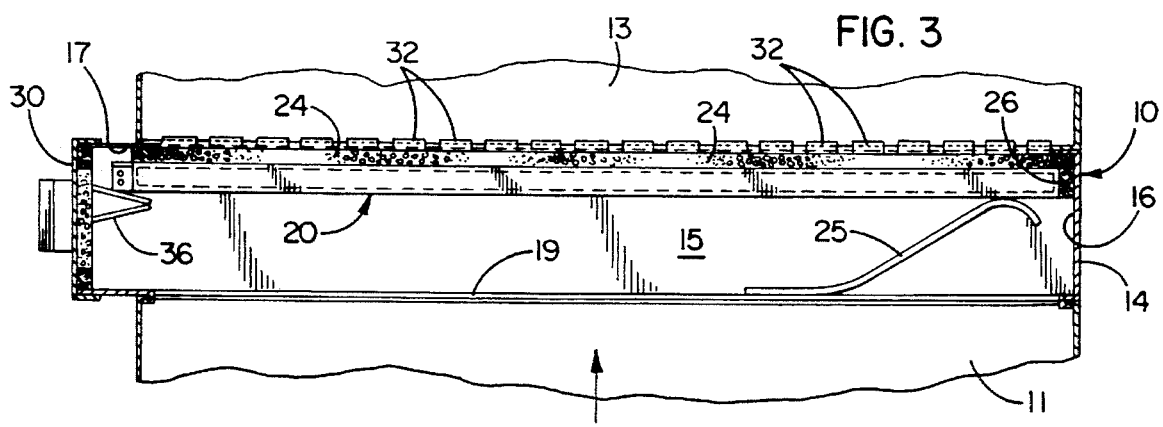
FIG. 3 is an enlarged transverse section through the filter mounting assembly substantially as seen in the direction of line 3—3 in FIG. 1.

As shown in FIGS. 2 and 3, in the illustrated embodiment of the present invention, the guide means 25 includes a pair of spring-loaded, thin, curved, metal deflectors (only one of which is shown) located on a generally rectangular flange 19 disposed at the entrance end of the air flow passage 16. Preferably, both guide deflectors 25 are positioned inwardly from the access opening 17 and near the end perimeter wall, with one located on the upper perimeter wall and the other located on the lower perimeter wall. In use, when the filter panel 20 is slid substantially across the air flow passage 16, the deflectors 25 guide the leading edge portion 21a of the filter panel 20 toward the internal sealing means 24, and when the filter panel 20 is slid completely across the air flow passage 16, the spring loading provided by the deflectors 25 keeps the leading edge portion 21a of the filter panel 20 in sealing engagement with the internal sealing means 24. Thus, the deflectors 25 provide two distinct functions—they direct the leading edge portion 21a of the filter panel 20 in the proper direction and, once the panel 20 is in position, they hold the leading edge portion 21a of the filter panel 20 firmly in place against the most inward portion of the internal sealing means 24. In keeping with another aspect of the invention, the spring-loaded deflectors 25 are resilient enough to accommodate and effectively seal filter panels 20 ranging in thickness from ½" to 2", including the industry standard 1" thick panel. The deflectors 25 provide ample spring loading for this range of filter thicknesses if, prior to filter panel 20 insertion, they extend substantially across the entire width of the air flow passage 16 and slightly touch the internal sealing means 24.

In accordance with another important aspect of the invention, means are provided for sealingly closing the access opening 17 of the filter housing 14 to prevent the leakage of unfiltered air around the trailing end portion 21c of the filter panel 20. In particular, a hingeless, removable door closure member 30 is provided which is selectively invertibly mountable to the access opening 17 such that the closure member 30 can be installed in either a first position (top side up) or in a second inverted position (top side down). Pursuant to the invention, a filter deflector 36, installed on the inner face of the closure member 30, urges the trailing edge portion 21c and the balance of the peripheral edge 21 of the filter panel 20 into substantial leak-free sealing engagement with the internal sealing means 24 when the closure member 30 is assembled to the access opening 17.

Figure 4A:
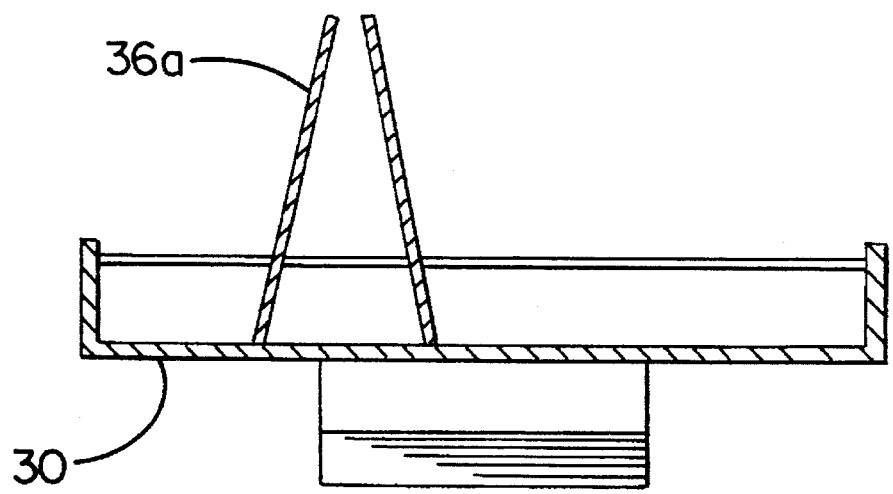
FIG. 4 is an enlarged transverse section through the door closure member as seen in the direction of line 4—4 in FIG. 2.
Figure 4B:
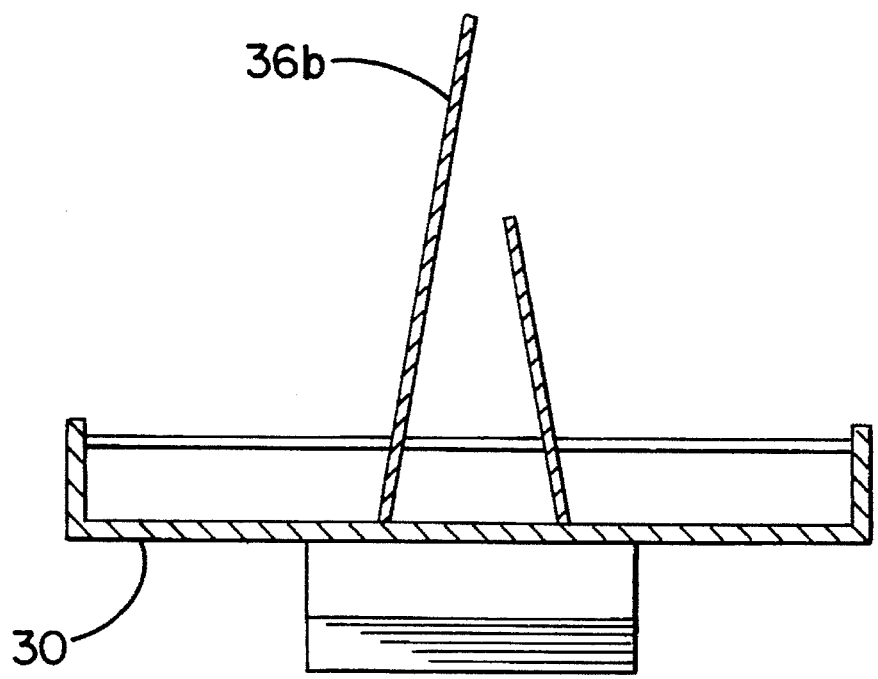

In the illustrated embodiment, the filter deflector 36 is generally wedge-shaped and dual-sided, as depicted in FIG. 4. Preferably, the two sides are roughly equal in length and the deflector 36 is slightly offset from the longitudinal center-line of the door closure member 30. In operation, when a filter panel 20 having a relatively small thickness (i.e. ½" to 1") is installed into the housing 14, the door closure member 30 should be mounted to the access opening 17 in the first position such that the deflector 36 is closer to the discharge end of the air flow passage 16 than to the entrance end. Conversely, when a filter panel 20 having a comparatively greater thickness (i.e. 1" to 2") is used, the door closure member 30 should be mounted to the access opening 17 in the second (inverted) position such that the deflector 36 is closer to the entrance end than to the discharge end. Thus, simply by properly orienting the closure member 30 in either the first or second position, the filter mounting assembly 10 can accommodate and effectively seal filter panels 20 of different thicknesses, ranging from ½" to 2". And, regardless of the relative thickness of the filter panel 20, when the closure member 30 is correctly assembled to the access opening 17, the filter deflector 36 will urge the trailing edge portion 21c and the balance of the peripheral edge 21 of the filter panels 20 into tight sealing engagement with the internal sealing means 24.

In an alternative embodiment, at least one side of the filter deflector 36 is long enough to engage and urge custom-built air filter panels 20 of shorter-than-standard length into sealing engagement with the internal sealing means 24.

In both of the above-described embodiments it will be understood that the side of the filter deflector 36 applies an appropriate amount of pressure to the trailing edge portion 21c of the filter panel 20 such that it, in conjunction with the spring-loaded guide means 25, presses the entire peripheral edge 21 of the filter panel 20 into substantial leak-free engagement with the internal sealing means 24. Moreover, since the deflector 36 is automatically removed with the door closure member 30 during filter panel 20 servicing, the access opening 17 will be thoroughly devoid of obstructions that might otherwise catch or snag the filter medium 22 as the filter panel 20 is removed from the housing 14. A snag-free work space is especially important with expensive electrostatic and electronic filters which are easily damaged and/or shorted out.

After the door closure member 30 has been assembled to the access opening 17, the closure member 30 may be securely, but removably, joined to the filter housing 14 by perimeter wall connecting means which, in the embodiment depicted in FIG. 2, consists of a pair of tabs 39 located on the upper and lower ends of the closure member 30 which mate with the tabs 29 positioned on the upper and lower ends of the access opening 17. The closure member 30 is securely fastened to the filter housing 14 simply by sliding the closure member 30 downward until there is full engagement between the closure member tabs 39 and the access opening tabs 29. Alternatively, during filter panel 20 removal, the door closure member 30 may be uncoupled from the access opening 17 by lifting the closure member 30 upward until the closure member tabs 39 become disengaged from the access opening tabs 29 and then pulling the closure member 30 from the access opening 17.

In keeping with another aspect of the present invention, converting the filter mounting assembly 10 from a screen electrostatic or fiberglass panel 20 to an electronic panel 20 is a straightforward procedure that does not require any modification to the existing housing 14. In particular, after the existing filter panel 20 has been replaced, the only operation that is required is a simple wire connection from the new electronic panel 20 to the fan control low voltage power supply (not shown). Making the same change on a conventional prior art filter mounting assembly, on the other hand, typically requires housing alterations and several man-hours of labor.

Furthermore, as an added feature of the present invention, the discharge end of the housing 14 is provided with a plurality of notched tabs 32 around the perimeter thereof which may be conveniently bent over a flange on the intake duct 13 or furnace cabinet 12 to secure the filter assembly housing 14.

We claim as our invention:

1. A mounting assembly for a replaceable air filter panel in a forced air heating or air conditioning unit having an entry portion defining an air intake opening, said filter panel being substantially rectangular in shape and having a peripheral edge including a leading edge portion and a trailing edge portion interconnected by a pair of spaced-apart guide edge portions, said mounting assembly comprising, in combination:

a filter housing having a plurality of perimeter walls defining a substantially rectangular internal cross section and an air flow passage therethrough having an entrance end and a discharge end, said discharge end of said housing being dimensioned to surround said air intake opening and including means for connecting said housing in substantially sealed relation to said entry portion of said unit;

one side of said perimeter walls having an access opening therein dimensioned for slidable insertion and retraction of said air filter panel therethrough;

internal sealing means disposed in said air flow passage and dimensioned for sealing engagement with said peripheral edge of said air filter panel;

guide means mounted in said air flow passage inwardly of said access opening, said guide means being disposed to urge said leading edge portion of said air filter panel into sealing engagement with said internal sealing means when said panel is slid substantially completely through said access opening and across said air flow passage, said guide means also being disposed and arranged to accommodate and effectively seal air filter panels of different thicknesses;

a door closure member for sealingly closing said access opening, said closure member being removably attached to said perimeter wall having said access opening therein; and panel securing means mounted on the inner face of said closure member and projecting inwardly therefrom for urging said trailing edge portion and the balance of said peripheral edge of said air filter panel into substantially leak-free sealing engagement with said internal sealing means when said panel is slid completely across said air flow passage and said closure member is attached to said perimeter wall to sealingly close said access opening, said panel securing means also being disposed and arranged to accommodate and effectively seal air filter panels of different thicknesses.

2. A mounting assembly as defined in claim 1 wherein said guide means includes a pair of spring-loaded deflectors disposed in said air flow passage substantially inwardly from said access opening and opposite said internal sealing means.

3. A mounting assembly as defined in claim 2 wherein said internal sealing means includes a strip of sealing material disposed about the inner periphery of said air flow passage adjacent the entrance end thereof.

4. A mounting assembly as defined in claim 3 wherein said internal sealing means includes a sealing strip disposed to abut said leading edge portion of said air filter panel when said panel is slid substantially completely across said air flow passage.

5. A mounting assembly as defined in claim 1 wherein said door closure member is formed with top and bottom portions having perimeter wall connecting means thereon, said closure member being selectively invertibly mountable on said perimeter wall to sealingly close said access opening.

6. A mounting assembly as defined in claim 5 wherein said panel securing means includes a dual-sided deflector.

7. A mounting assembly as defined in claim 6 wherein said dual-sided deflector is offset from the longitudinal center-line of said door closure member.

8. A mounting assembly as defined in claim 7 wherein said sides of said dual-sided deflector are substantially equal in length.

9. A mounting assembly as defined in claim 8 wherein said deflector is disposed and arranged to urge filter panels having a large thickness into sealing engagement with said internal sealing means when said door closure member is mounted to said access opening in a first position such that said deflector is disposed closer to said entrance end than to said discharge end, and said deflector being disposed and arranged to urge filter panels having a smaller thickness into sealing engagement with said internal sealing means when said door closure member is mounted to said access opening in a second inverted position such that said deflector is disposed closer to said discharge end than to said entrance end.

10. A mounting assembly as defined in claim 6 wherein at least one side of said dual-sided deflector is long enough to urge shorter-than-standard length air filter panels into sealing engagement with said internal sealing means.

11. A mounting assembly as defined in claim 1 wherein said unit is adapted to receive air from an air intake duct and said entrance end of said filter housing includes means for securing said air intake duct thereto.

12. A mounting assembly as defined in claim 1 wherein said filter housing is formed of sheet metal.

* * * * *